(12) United States Patent
Huang et al.

(10) Patent No.: US 10,797,612 B2
(45) Date of Patent: Oct. 6, 2020

(54) POWER DISTRIBUTION NETWORK

(71) Applicant: GE AVIATION SYSTEMS, LLC, Grand Rapids, MI (US)

(72) Inventors: Hao Huang, Troy, OH (US); Zhiqiao Wu, Red Lion, PA (US)

(73) Assignee: GE Aviation Systems LLC, Grand Rapids, MI (US)

( * ) Notice: Subject to any disclaimer, the term of this patent is extended or adjusted under 35 U.S.C. 154(b) by 151 days.

(21) Appl. No.: 15/666,173

(22) Filed: Aug. 1, 2017

(65) Prior Publication Data
US 2019/0044451 A1 Feb. 7, 2019

(51) Int. Cl.
| | |
|---|---|
| *H02M 5/458* | (2006.01) |
| *H02P 27/06* | (2006.01) |
| *H02J 3/46* | (2006.01) |
| *H02J 3/38* | (2006.01) |
| *H02M 7/487* | (2007.01) |
| *H02M 1/00* | (2006.01) |
| *H02M 7/06* | (2006.01) |
| *H02J 5/00* | (2016.01) |
| *H02J 3/36* | (2006.01) |
| *H02M 5/12* | (2006.01) |
| *H02M 7/5387* | (2007.01) |

(52) U.S. Cl.
CPC .......... *H02M 5/458* (2013.01); *H02J 3/381* (2013.01); *H02J 3/46* (2013.01); *H02M 7/487* (2013.01); *H02P 27/06* (2013.01); *B64D 2221/00* (2013.01); *H02J 3/36* (2013.01); *H02J 5/00* (2013.01); *H02M 5/12* (2013.01); *H02M 7/06* (2013.01); *H02M 7/5387* (2013.01); *H02M 2001/007* (2013.01); *H02M 2001/0074* (2013.01); *H02M 2001/0077* (2013.01)

(58) Field of Classification Search
CPC .................................................... H02M 7/797
See application file for complete search history.

(56) References Cited

U.S. PATENT DOCUMENTS

| | | | | |
|---|---|---|---|---|
| 6,046,513 | A | * | 4/2000 | Jouper ...................... H02J 1/14 307/31 |
| 7,050,311 | B2 | | 5/2006 | Lai et al. |
| 7,609,536 | B2 | | 10/2009 | Brochu et al. |
| 7,710,081 | B2 | | 5/2010 | Saban et al. |
| 7,960,948 | B2 | | 6/2011 | Saban et al. |

(Continued)

FOREIGN PATENT DOCUMENTS

| | | |
|---|---|---|
| CN | 104601003 A | 5/2015 |
| EP | 3 367 535 A1 | 8/2018 |

OTHER PUBLICATIONS

Extended European Search Report and Opinion issued in connection with corresponding EP Application No. 18185566.9 dated Sep. 20, 2018.

*Primary Examiner* — Kawing Chan
*Assistant Examiner* — Bradley R Brown
(74) *Attorney, Agent, or Firm* — McGarry Bair PC (57) ABSTRACT

A power distribution system includes a first set of power converters arranged with a respective set of power inputs, and having a respective set of power outputs, and at least one controller module communicatively connected with the first set of power converters and configured to controllably adjust the power conversion of the first set of power converters, and method of operating the power distribution system.

24 Claims, 7 Drawing Sheets

(56) References Cited

U.S. PATENT DOCUMENTS

| | | | |
|---|---|---|---|
| 8,374,009 B2 | 2/2013 | Feng et al. | |
| 2007/0222220 A1* | 9/2007 | Huang | F02N 11/04 290/31 |
| 2007/0223258 A1 | 9/2007 | Lai et al. | |
| 2013/0051091 A1* | 2/2013 | Datta | H02M 5/4505 363/35 |
| 2013/0154349 A1 | 6/2013 | Sihler et al. | |
| 2013/0274946 A1* | 10/2013 | Schelenz | H02J 3/383 700/297 |
| 2013/0279224 A1* | 10/2013 | Ofek | H02M 7/219 363/89 |
| 2015/0061607 A1* | 3/2015 | Pan | H02K 3/28 322/27 |
| 2016/0036220 A1* | 2/2016 | Lacaux | H02M 3/04 307/9.1 |
| 2016/0039371 A1* | 2/2016 | Blumer | B60L 50/10 290/31 |
| 2016/0049880 A1 | 2/2016 | Kim et al. | |
| 2016/0096437 A1* | 4/2016 | Tripathi | H02J 3/381 307/31 |
| 2016/0185237 A1* | 6/2016 | Ha | B60L 11/1803 318/139 |
| 2017/0256957 A1* | 9/2017 | Buiel | B60L 50/61 |

* cited by examiner

POWER DISTRIBUTION NETWORK

BACKGROUND OF THE INVENTION

Electrical power systems, such as those found in an aircraft power distribution system, employ power generating systems or power sources, such as generators, for generating electricity for powering the systems and subsystems of the aircraft. As the electricity traverses electrical bus bars to deliver power from power sources to electrical loads, controllable power converters ensure that the power delivered to the electrical loads meets the designed power criteria for the loads or distribution system.

Hybrid electrical propulsion systems transfer high electrical power from engines to remote places on the aircraft such as the tail end of aircraft. To minimize the losses in the transmission over distance, high voltage is desired. However, high voltage generators typically include high voltage insulation and the like to prevent electrical faults, which likely increase the weight of the power systems and aircraft.

BRIEF DESCRIPTION OF THE INVENTION

In one aspect, the present disclosure relates to a power distribution system including a first set of power converters arranged with a respective set of power inputs in series, and having a respective set of power outputs, and at least one controller module communicatively connected with the first set of power converters and configured to controllably adjust the power conversion of the first set of power converters such that each of the first set of power converters are limited to a predetermined amount of power.

In another aspect, the present disclosure relates to a method of operating a power distribution system, including obtaining, by a set of power converters arranged in series, a large power supply, converting, by the set of power converters, a portion of the large power supply to a respective set of power converter outputs, sensing, by a set of power sensors, a quantity of power converted by a subset of the power converters, comparing, by a controller module, the respective sensed quantities of power with a threshold power value, and limiting, by the controller module, the quantity of power converted by the subset of the power converters when the respectively sensed quantity of power exceeds the threshold power value, such that each respective power converter obtaining is limited to a predetermined amount of the large power supply.

In yet another aspect, the present disclosure relates to a method of operating a power distribution system, including obtaining, by a first set of power converters, a high power output greater than 2 kilovolts direct current (DC) or 1 kilovolt alternating current (AC) phase voltage, and dynamically converting, by the first set of power converters, the high power output to a respective first set of low power outputs. The dynamic converting enables each of the first set of power converters to convert a substantially equal portion of the high power output.

DESCRIPTION OF EMBODIMENTS OF THE INVENTION

The described aspects of the present disclosure are directed to a method and apparatus associated with a power distribution network or system. One example environment where such a method and apparatus can be used includes, but is not limited to, a power distribution system for an aircraft. While this description is primarily directed toward a power distribution system for an aircraft, it is also applicable to any commercial or residential environment using a power distribution system where input power is received, acted upon (if necessary), e.g., converted or modified, and distributed to one or more electrical loads.

While "a set of" various elements will be described, it will be understood that "a set" can include any number of the respective elements, including only one element. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

While terms such as "voltage", "current", and "power" can be used herein, it will be evident to one skilled in the art that these terms can be interchangeable when describing aspects of the electrical circuit, or circuit operations. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured, connected, or connectable to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

The exemplary drawings are for purposes of illustration only and the dimensions, positions, order and relative sizes reflected in the drawings attached hereto can vary.

Figure 1:
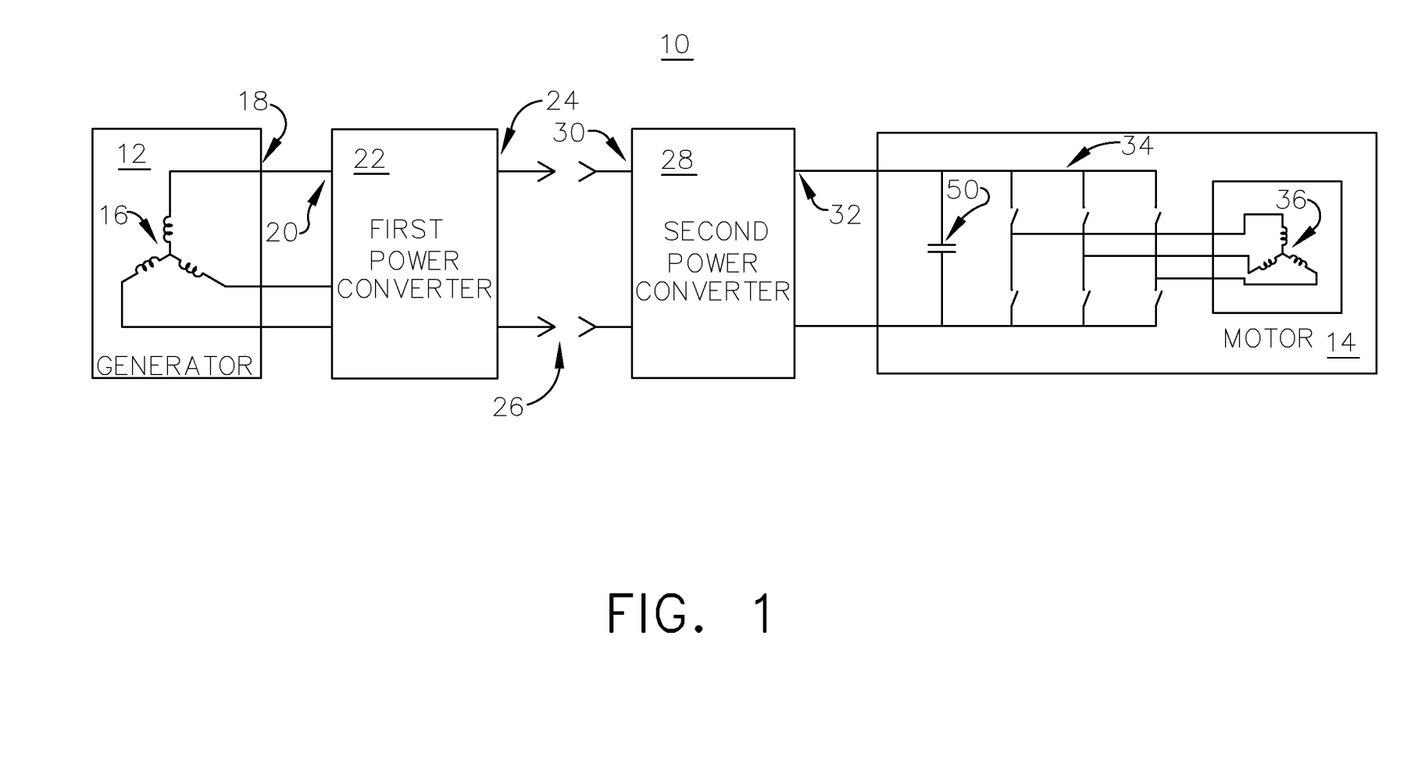
FIG. 1 is a schematic view of a direct current power distribution system in accordance with various aspects described herein.

As illustrated in FIG. 1, a power distribution system 10 generally includes a power source, shown as a generator 12 and an electrical load, shown as a motor 14. In one non-limiting aspect of the disclosure, the generator 12 can include a set of power-generating windings, shown as alternating current (AC) generator windings 16, which generate, supply, or otherwise provide electrical power at a generator output 18 as the generator 12 operates. While a generator 12 with AC generator windings 16 and an AC output 18 are shown, aspects of the disclosure can be included wherein, for example, a direct current (DC) generator can provide a DC output. In yet another non-limiting aspect of the disclosure, the power source can include another power-supplying source, such as batteries, solar cells, fuel cells, or the like.

The power supplied by the power source or generator 12 can be conductively provided or supplied to a first power converter 22 having a power input 20 and a power output 24. In this sense, the power output 18 of the power source can be conductively connected with the power input 20 of the first power converter 22. The power output 24 of the first power converter 22 can further be conductively connected with a second power converter 28 by way of a set of conductors, such as transmission lines 26, bus bars, or the like. The transmission lines 26 are illustrated with a non-continuous space to illustrate that they can span any distance, even to an extended range, such as meter, kilometers, or the like, but are understood to be connected.

The second power converter 28 further includes a power input 30 connected with the power output 24 of the first power converter 22 or the transmission lines 26, and a power output 32 conductively connected with the electrical load or motor 14. Non-limiting aspects of the motor 14 can include an inverter, shown as a transistor bridge 34 enabled or controllably operable to invert a DC power received by the motor 14 or supplied by the second power converter power output 32 to AC power further supplied to a set of AC windings 36 of the motor 14. In one non-limiting example, the transistor bridge 34 can include a capacitor 50 disposed across the bridge input, or the transistor bridge can be a motor drive.

During operation of the power distribution system 10, the generator 12 generates or supplies power, such as AC power, at the generator output 18 to the power input 20 of the first power converter 22. In one non-limiting example, the generator 12 or power source can be configured to generate power at 230 volts AC. As used herein, non-limiting power characteristics of the power supplied to the power input 20 of the first power converter 22 can be referred to as "low" voltage power. In non-limiting examples, 230 volts AC can be at a "low" voltage power.

The first power converter 22 is enabled or controllably operable to convert power received at the power input 20, such as low voltage AC power, to another or to a different power supplied to the power output 24. Non-limiting examples of power conversion enabled by the first power converter 22 can include step-up or step-down power conversion, DC to AC power conversion, AC to DC power conversion, switching operations, the like, or a combination thereof. In the illustrated example, the first power converter 22 can be adapted to convert 230 volts AC received at the power input 20 to 1080 volts DC, 2160 volts DC, or greater than 2160 volts DC power supplied to the power output 24. In this sense, non-limiting aspects of the first power converter 22 can include an AC to DC power converter having a rectifying circuit enabled to rectify AC power to DC power. In another non-limiting aspect, the first power converter 22 can be a boost converter, that is, a power converter that steps-up power converted. As used herein, non-limiting power characteristics of the power provided by the power output 24 of the first converter 22 can be referred to as "high" voltage power. In non-limiting examples, DC voltages of 1080 volts, 2160 volts, or greater than 2160 volts can be a "high" voltage power.

The high voltage power supplied by the power output 24 of the first power converter 22 is provided to the power input 30 of the second power converter 28 by way of the transmission lines 26. The second power converter 28 can be enabled or controllably operable to convert power received at the power input 30, such as high voltage DC power, to another or to a different power supplied to the power output 32. Non-limiting examples of power conversion enabled by the second power converter 28 can be different from the power conversion enabled by the first power converter 22. Thus, non-limiting examples of power conversion enabled by the second power converter 28 can include step-up or step-down power conversion, DC to DC power conversion, switching operations, the like, or a combination thereof. In the illustrated example, the second power converter 28 can be adapted to convert 1080 volts, 2160 volts, or greater than 2160 volts DC received at the power input 30 to 540 volts DC power supplied to the power output 32 (a "low voltage" power output). In this sense, non-limiting aspects of the second power converter 28 can include a DC to DC power converter that steps-down power converted to another low voltage DC power.

The low voltage DC power supplied by the power output 32 of the second power converter 28 is provided to the electrical load or motor 14, wherein the transistor bridge 34 is operable to invert the low voltage DC power to an AC power provided to the set of motor windings 36. Non-limiting examples of transistor bridge 34 operations can include, for instance, providing a starting power to the motor windings 36 or providing a running or operating (i.e. non-starting) power to the motor windings 36. Specific operations of the transistor bridge 34, or control thereof, is not germane to the disclosure.

Figure 2:
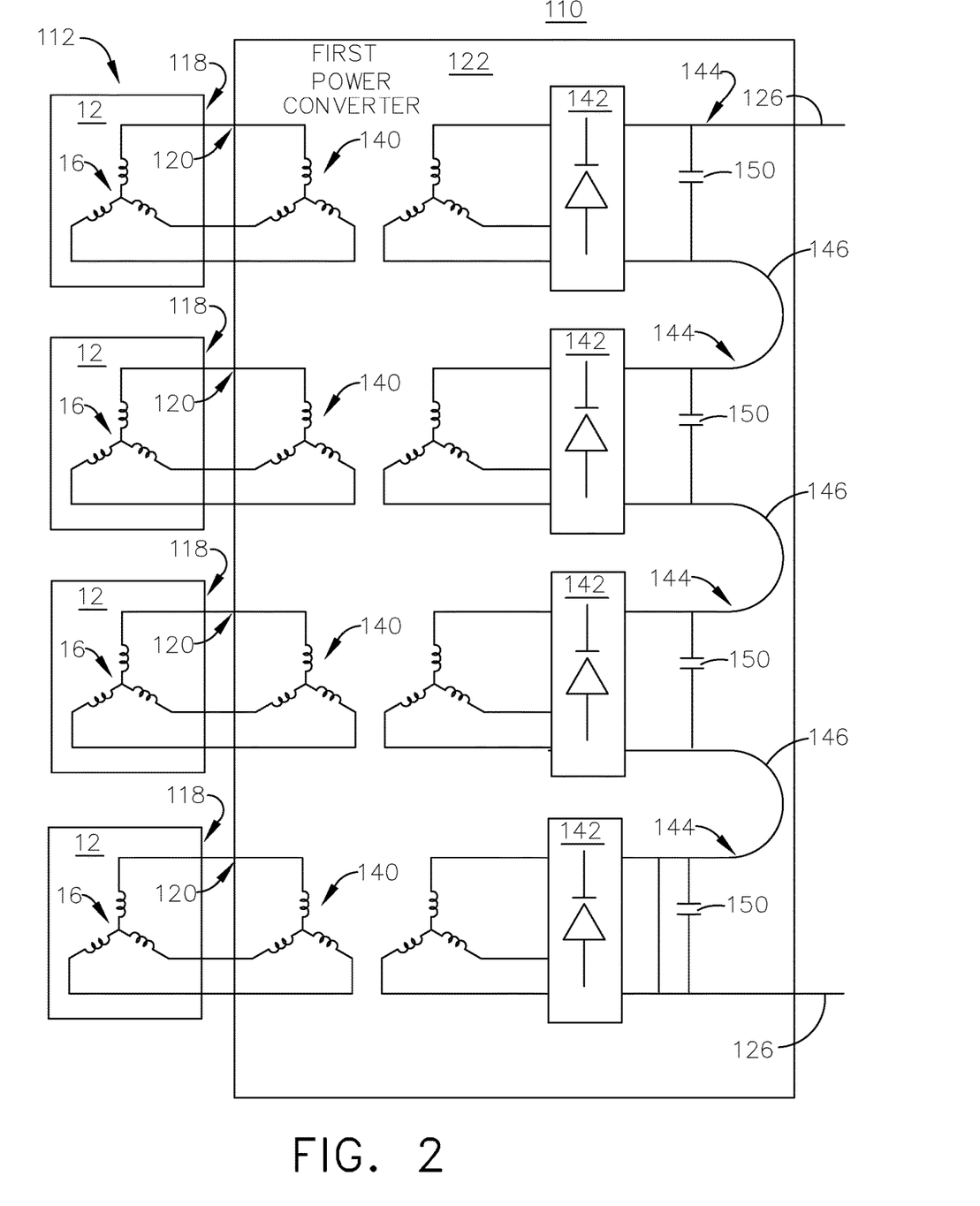
FIG. 2 is a schematic view of a set of power sources for another direct current power distribution system, in accordance with various aspects described herein.
Figure 3:
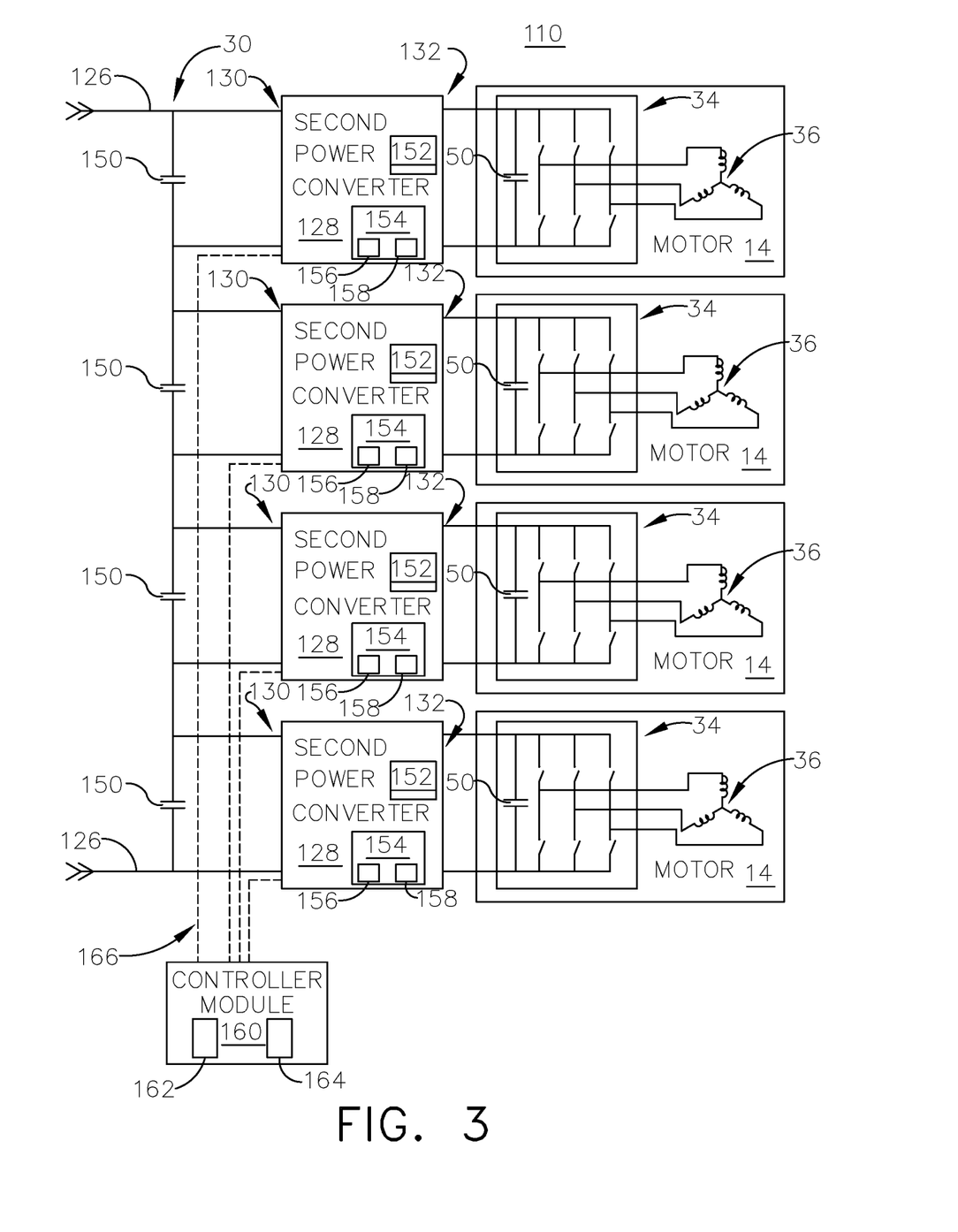
FIG. 3 is a schematic view of a set of power converters and electric motors for the direct current power distribution system of FIG. 2, in accordance with various aspects described herein.

FIGS. 2 and 3 illustrate another power distribution system 110 according to another aspect of the present disclosure. The power distribution system 110 is similar to the power distribution system 10; therefore, like parts will be identified with like numerals increased by 100, with it being understood that the description of the like parts of the power distribution system 10 applies to the power distribution system 110, unless otherwise noted. One difference between the power distribution system 110, compared with the power distribution system 10, is that the power distribution system 110 includes a set of generators 112, and a set of electrical loads, such as a set of electric motors 116. FIG. 2 illustrates the set of generators 112 and the first power converter 122 of the power distribution system 110, while FIG. 3 illustrates a set of second power converters 132 and the set of electrical loads or electric motors 114 of the power distribution system 110.

As shown in FIG. 2 the set of generators 112 can provide their respective generator power outputs 118 to a corresponding set of power inputs 120 of a common (e.g. singular) first power converter 122. The first power converter 122 can include a respective power transformer 140 and rectifying component 142, schematically illustrated and sequentially arranged with the respective power input 120. In this sense, a respective grouping of one power transformer 140 and one rectifying component 142 can be associated with a respective generator power output 118, a respective power input 120 of the first power converter 122, or a combination thereof. Non-limiting aspects of the disclosure can be included wherein the power transformer 140 can include a power electronic transformer, a step-up voltage transformer, an isolation transformer, the like, or a combination thereof, and wherein the rectifying component 142 can include a rectifier bridge or the like. Each respective set of the power transformer 140 and rectifying component 142 can have a power output 144, wherein the each power output 144 from each of the respective sets of power transformers 140 and rectifying components 142 are connected in series by conductive connectors 146.

Thus, non-limiting aspects of the disclosure can be considered to include wherein a respective set of the power transformer 140 and rectifying component 142 are configured or operable to receive a low voltage generator power output 118 at a respective first power converter input 120, step-up the voltage by way of the power transformer 140, and rectify the stepped-up voltage by way of the rectifying component 142 to a high voltage DC power output 144. The series configuration of the set of high voltage power outputs 144 and connectors 146 summate the high voltage DC power outputs to a bus voltage, provided at the overall power output of the first power converter 122 to the transmission lines 126. As shown, non-limiting aspects of the disclosure can include a set of capacitors 150 disposed across the power output 144 of at least a subset of the rectifying components 142.

While a set of four generators 112 are shown, it will be understood that aspects of the disclosure can be included wherein any number of generators can be included. In the aforementioned examples, each respective power output 144 can provide 270 volts DC, for an illustrated combined power output at 1080 or 2160 volts DC (e.g. greater than 2 kilovolts DC). Non-limiting aspects of the disclosure can be included wherein, for example, the combined power output 124 is alternatively measured as power. Additional or alternative power, currents, or voltages can be included. While the set of generators 112 are illustrated substantially alike, or can be substantially alike in terms of power ratings, power outputs, or electrical output characteristics, non-limiting aspect of the disclosure can be included wherein a set of dissimilar or dislike generators 112, alternative power sources (e.g. batteries, solar cells, fuel cells, the like), or a combination thereof can be included to provide dissimilar generator output 118 characteristics. In yet another non-limiting aspect of the disclosure, any combination or permutation of generators 12 having a single set of generator windings 16 or generators 12 having multiple sets of generator windings 16 can be included. Additionally, while a single first power converter 122 is shown, non-limiting aspects of the disclosure can be included wherein a set of power converters 122 are included, each power converter 122 having at least one power transformer 140, a rectifying component 142, or a combination thereof, and associated with at least one generator 12, power source, generator power output 118, or the like. Non-limiting aspects of the disclosure can include a set of capacitors 150 disposed across the power input 130 of at least a subset of the second power converters (see FIG. 2).

FIG. 3 illustrates another aspect of the power distribution system 110. As shown, the power distribution system 110 can include a set of second power converters 128 associated with the respective set of electrical loads, such as the motors 14. The transmission lines 126 can be connected with a power input 30 for the set of second converters, each having individual respective power inputs 130 arranged in series.

At least a subset of the second power converters 128 can include a controller module 154 having a processor 156 and memory 158 configured to enable or operably control the power conversion, operations, or technical effects of the respective second power converter 128. At least a subset of the second power converters 128 can also include a sensor 152, including but not limited to a voltage sensor, a current sensor, a power sensor, or the like. Non-limiting aspects of the sensor can be included wherein the sensor is configured or adapted to sense or measure power consumed, power converted, power received, power delivered, or a related sensing or measuring thereof, for at least one of the respective second power converter 128, or the power input 130 or power output of the respective second power converter 128. While the sensor 152 is schematically illustrated as a subcomponent of the second power converter 128, non-limiting aspects of the disclosure can be included wherein the sensor is associated with at least one of the set of second power converters 128, such as in-line with the power input 130, power output 132, or combination thereof.

The set of sensors 152, the set of controller modules 154, or a combination thereof can be further connected to a power distribution system controller module 160 having a processor 162 and memory 164, by a set of communicative connections 166. In this sense, the set of sensors 152, the set of controller modules 154, or a combination thereof can communicate instructions, sensed or measured values, or the like to an overall system controller module 160, that, for example, can controllably operate or enable the operation of the individual second power converters 128. The set of second power converters 128 can operably convert at least a subset of the power received at the power inputs 30, 130 to another power provided to the respective power output 132, as described herein.

Non-limiting aspects of the disclosure can be included wherein each respective motor 14 of the set of motors 114 can be associated with an independent second power converter 128. In another non-limiting aspect of the disclosure, a subset of the second power converters 128 can be combined in a single power converter 128. Additionally, while independent motors 14 are illustrated, aspects of the disclosure can be incorporated or included in motors having multiple sets of motor windings 36, wherein at least a subset of the multiple sets of motor windings 36 receive power from a second power converter 128.

During operation, it may be desirable to ensure that each of the set of motors 114 receive a consistent or predetermined quantity or supply of power from the transmission lines 126. Thus, the set of second power converters 128 can by dynamically operated to controllably adjust the power conversion or power converted by the respective second power converter 128 to limit the power converted, consumed, of otherwise utilized, when needed. Non-limiting aspects of the disclosure can be considered to include wherein, for example, the predetermined quantity or supply of power varies between dissimilar motors 14, or wherein the predetermined quantity or supply of power for each respective motor 14 is substantially equal. As used herein, a "substantially equal" supply of power can include equal amounts of power within a predetermined tolerance, including but not limited to a one percent tolerance.

Thus, non-limiting aspects of the disclosure can be considered to include wherein during operation of the power distribution system 110 or power converting operations, the sensor 152 can sense or measure a value related to the power received, converted, or consumed by a respective second power converter 128. That sensed or measured value, or another value or signal representative thereof, can be provided to at least one of the controller module 154 of the respective second power converter 128, the system controller module 160, or a combination thereof. The controller module 154 of the respective second power converter 128, the system controller module 160, or a combination thereof, can then determine whether the sensed value is in accordance with a desired power received, converted, or consumed by the respective second power converter 128, and if necessary, generate or modify control instructions to limit the power received, converted, or consumed by the respective second power converter 128.

As used herein, the term "satisfies" with respect to a threshold value means that the sensed value is equal to or greater than a power threshold value, or being within a power threshold value range (e.g. within tolerance). It will be understood that such a determination may easily be altered to be satisfied by a positive/negative comparison or a true/false comparison.

In one non-limiting example, determining whether the sensed value is in accordance with a desired power can include comparing the sensed value with a power threshold value associated with the respective second power converter 128. In instances wherein, for example the sensed value exceeds or satisfies the power threshold value, the controller module 154, 160 can generate or modify control instructions to limit the power received, converted, or consumed by the respective second power converter 128. In another non-limiting example, determining whether the sensed value is in accordance with a desired power can include comparing a set of sensed values from a set of sensors 152, and comparing the values to one another, or summation or difference calculations between the set of sensed values. For example, in one non-limiting instance, the a first sensed power value for a sequentially upstream second power converter 128 can be compared with a second sensed power value for a downstream second power converter 128 to ensure the respective upstream and downstream second power converters 128 are receiving the desired or substantially equal power from the transmission lines 126.

By ensuring that a respective second power converter 128 is limited to a predetermined quantity of power received, the power distribution system 110 described herein can ensure, allow, or enable the system 110 such that each electrical load or electric motor 14 can receive a predetermined or equal share of power supplied by the transmission lines 126 during operations, regardless of the power desired by the other electrical loads or electric motors 14. Operations described herein can be particularly relevant during electric motor 14 startup operations, when motors 14 typically desire additional power to initiate operations.

Figure 4:
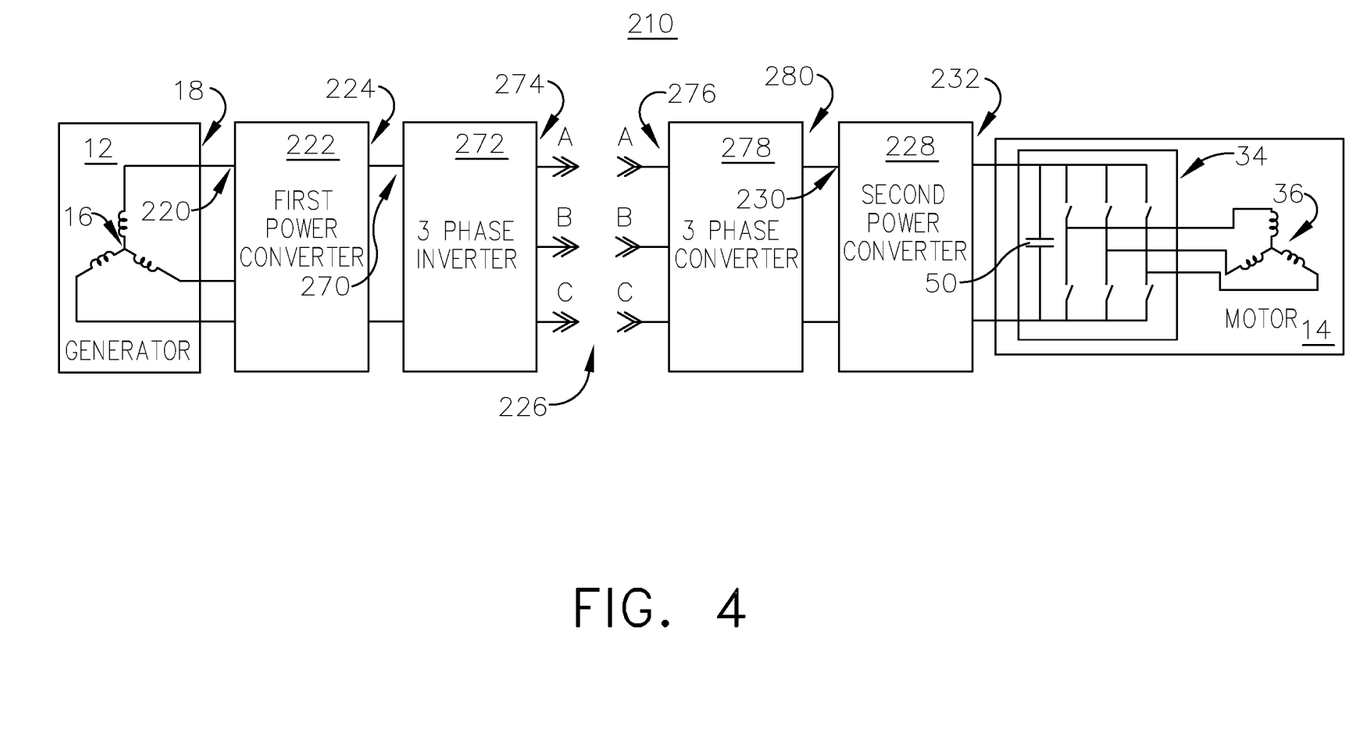
FIG. 4 is a schematic view of an alternating current power distribution system, in accordance with various aspects described herein.

FIG. 4 illustrates another power distribution system 210 according to another aspect of the present disclosure. The power distribution system 210 is similar to the power distribution systems 10, 110; therefore, like parts will be identified with like numerals increased by 200, with it being understood that the description of the like parts of the power distribution systems 10, 110 applies to the power distribution system 210, unless otherwise noted. One difference is that the power distribution system 210 includes a set of transmission lines 226 adapted to transmit three phase power between the generator 12 and the electric motor 14.

As shown, the power output 18 of the generator 12 can be provided to the power input 220 of the first power converter 222. The first power converter 222 can operate as described herein. The power output 224 of the first power converter 222 can be connected with the power input 270 of a three phase inverter 272 adapted or configured to invert the high voltage DC power output 224 of the first power converter 222 to a high voltage three phase power output 274 provided to the three phase transmission lines 226 (denoted with phases 'A,' 'B,' and 'C').

The three phase transmission lines 226 can be further connected with the power input 276 of a three phase converter 278 adapted to rectify the high voltage three phase power received by the transmission lines 226 to a high voltage DC power provided to a converter power output 280. The three phase converter power output 280 can be connected with the power input 230 of the second power converter 228, which, as explained herein, converts the high voltage DC power to a low voltage DC power at the power output 232.

Figure 5:
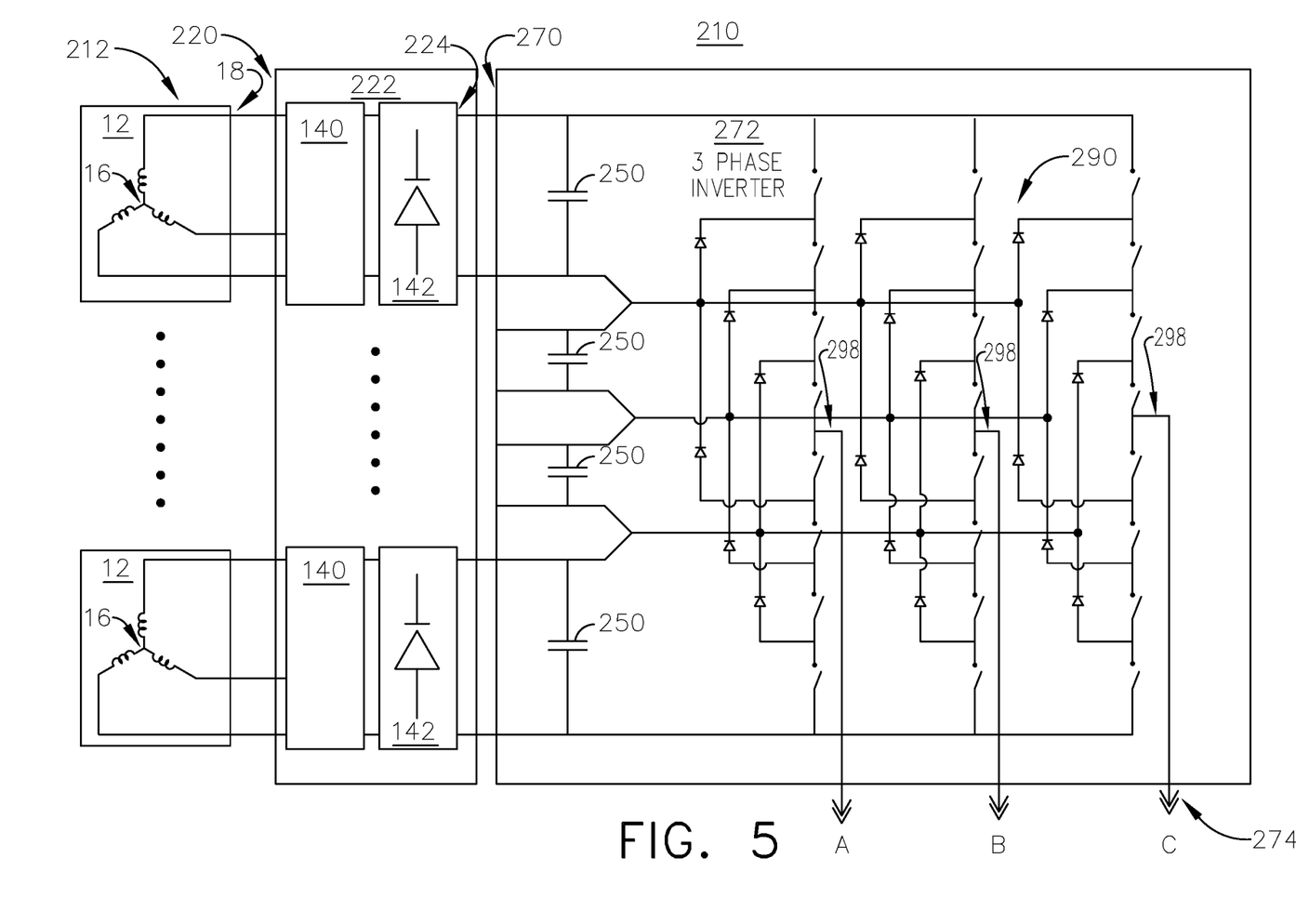
FIG. 5 is a schematic view of a set of power sources for another alternating current power distribution system, in accordance with various aspects described herein.
Figure 6:
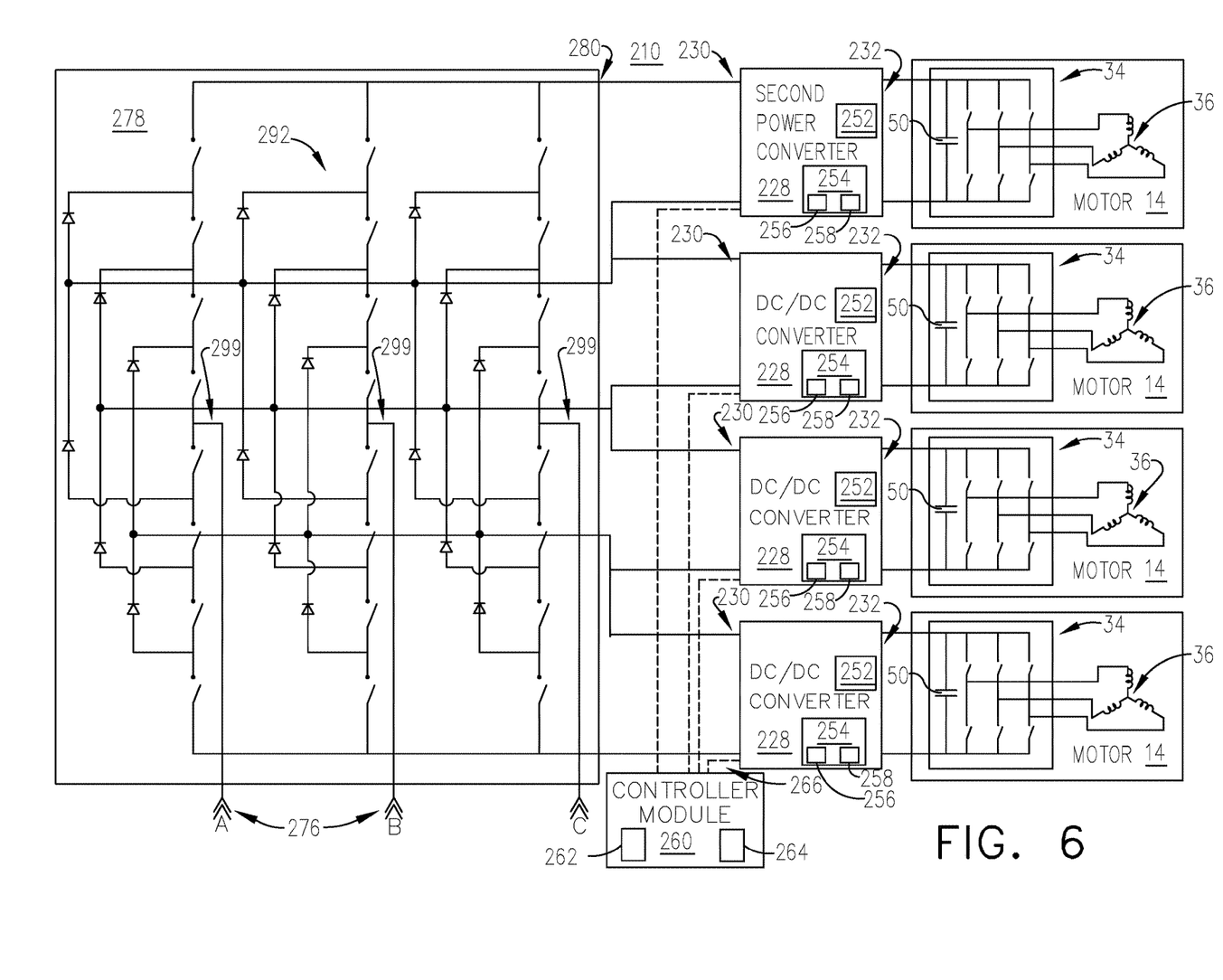
FIG. 6 is a schematic view of a set of power converters and electric motors for the alternating current power distribution system of FIG. 5, in accordance with various aspects described herein.

FIGS. 5 and 6 illustrate further aspects of the power distribution system 210. As shown in FIG. 5, the first power converter 222 can include a power transformer 140 and rectifying component 142 associated with each respective generator 12 in the set of generators 112, as described herein. The respective high voltage power output 224 from the rectifying component 142 can be connected with a respective high voltage power input 270 of the three phase inverter 272, as shown. Each high voltage power input 270 can include a capacitor 250 disposed across the high voltage power input 270. The set of high voltage power inputs 270 can form the basis of a power input for a transistor bridge 290 enabled, configured, or otherwise operable to receive the series arrangement of the high voltage power input 270, and invert the high voltage power input 270 to a high voltage multiphase power output 274 at phase voltage of 460, 920, 1 kilovolt, or greater, volts AC. As shown, the transistor bridge 290 can include three phase legs 298, lines, or the like, wherein the set of legs 298 can represent respective phases of the high voltage multiphase power output 274. In one non-limiting example, the high voltage multiphase power output 274, can be greater than 920 volts AC, such as 1 kilovolt AC phase voltage. Specific operations of the transistor bridge 290, or control thereof, is not germane to the disclosure.

Turning now to FIG. 6, the multiphase high voltage power output 274 of the three phase inverter 272 can be received by the high voltage power input 276 (at phase voltage of 460, 920, 1000, or greater, volts AC) of the three phase converter 278. As shown, the three phase converter 278 can include a transistor bridge 292 enabled, configured, or otherwise operable to receive the multiphase high voltage power input 276 and convert or rectify the high voltage three phase power to a set of or series of high voltage DC power outputs 285. As shown, the transistor bridge 292 can include three phase legs 299, lines, or the like, wherein the set of legs 299 can represent respective phases of the high voltage power input 276. Specific operations of the transistor bridge 292, or control thereof, is not germane to the disclosure. The high voltage DC power outputs 285 can be connected to a respective set of second power converter 228 high voltage DC power inputs 230, which can operate similar to the second power converters 128 described herein.

While aspects of the disclosure illustrate and describe the three phase power transmission of the power distribution system 210, non-limiting aspects of the power system 210 can be included wherein any number of phases or legs 298, 299 can be included based on the disclosure. For example, non-limiting aspects of the disclosure can include a three phase, 4 wire power transmission, a three phase power transmission with a neutral line or neutral, or the like. In the non-limiting example of three phase power transmission with a neutral transmission line, it will be understood that another leg 298, 299 or portion of the transistor bridges 290, 292 can be included and operated to provide the neutral line. Additional examples are envisioned.

Figure 7:
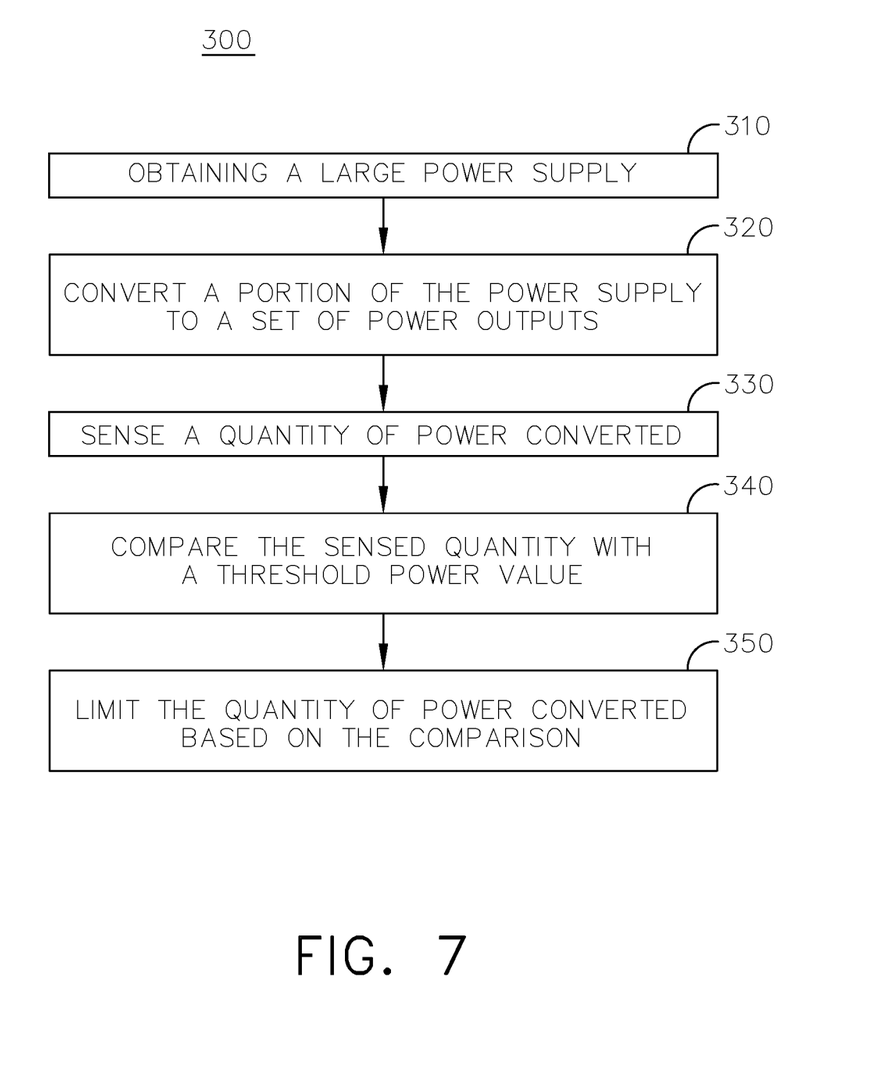
FIG. 7 is a flow chart diagram demonstrating a method of operating a power distribution system, in accordance with various aspects described.

FIG. 7 illustrates a flow chart demonstrating a method 300 of operating a power distribution system 10, 110, 210, as described herein. The method can include obtaining, by a set of power converters arranged in series, such as the set of second power converters 22, 122, 222, a large power supply, such as the high voltage power received by the transmission lines 26, 126, 226, at 310. Next the method 300 can include converting, by the set of power converters, a portion of the large power supply to a respective set of power converter outputs, such as the second power converter power outputs 32, 132, 232, at 320. The method 300 can further include sensing, by a set of power sensors, such as sensors 152, 252, a quantity of power converted by a subset of the power converters, at 330. The method 300 can then operate by comparing, by a controller module 154, 160, 254, 260, the respective sensed quantities of power with a threshold power value, at 340. Finally, the method 300 can limit, by the controller module 154, 160, 254, 260, the quantity of power converted by the subset of the power converters when the respectively sensed quantity of power exceeds the threshold power value, such that each respective power converter obtaining is limited to a predetermined amount of the large power supply, at 350.

The sequence depicted is for illustrative purposes only and is not meant to limit the method 300 in any way as it is understood that the portions of the method can proceed in a different logical order, additional or intervening portions can be included, or described portions of the method can be divided into multiple portions, or described portions of the method can be omitted without detracting from the described method. For example, non-limiting aspects of the disclosed method 300 can include generating, by a set of generators 112, 212 arranged in series, the large power supply, wherein the large power supply exceeds 2 kilovolts DC or 1 kilovolt AC phase voltage. Another non-limiting aspect of the method 300 can include supplying the converted portion of the large power supply to a respective set of electric motors 114, 214.

In another non-limiting aspect of the method, the method can include obtaining, by a first set of power converters (e.g. the set of second power converters 28, 128, 228), a high voltage power output greater than 1080 volts DC, 2160 volts DC (e.g. greater than 2 kilovolts DC), 460 volts AC phase voltage, 920 volts AC phase voltage, or greater than 1 kilovolt AC phase voltage, and dynamically converting, by the first set of power converters (e.g. the set of second power converters 28, 128, 228) the high power output to a respective first set of low power outputs, such as power outputs 32, 132, 232. In this example method, the dynamic converting enables each of the set of power converters to convert a substantially equal portion of the high power output.

Additional or alternative method steps can further include generating, in a set of generators 112, 212, a second set of low voltage power supplies and converting, in a second set of power converters (e.g. the first set of power converters 22, 122, 222), the second set of low voltage power supplies to a set of high voltage power supplies arranged in series, summating to the high power output. The dynamic converting can be based at least in part on the sensing step by the sensors 152, 252. A controller module 154, 160, 254, 260 can compare the respective sensed quantities of power with the threshold power value, and limit, by the controller module 154, 160, 254, 260, the quantity of power converted by at least a subset of the first set of power converters when the respectively sensed quantity of power exceeds the threshold power value.

Many other possible aspects and configurations in addition to that shown in the above figures are contemplated by the present disclosure. Additionally, non-limiting aspects of the disclosure can be included wherein any number of power generator systems can be included (e.g. three generator systems, four generator systems, five generator systems, etc.) in the power distribution system, as needed or desired. Additionally, the design and placement of the various components can be rearranged such that a number of different in-line configurations could be realized.

The aspects disclosed herein provide a method and apparatus for a power distribution system configured or adapted for generating low voltage power and operating low voltage electrical loads such as electric motors, while distributing or transmitting the power over a longer distance by way of high voltage transmission lines. One advantage that can be realized in the above aspects is that the tailoring to the particularized power distribution needs can reduce the number of unnecessary or redundant power distribution components, while providing a comparably level of power distribution characteristics or redundancies. Additionally by utilizing high voltage DC power transmission, transmission cable weight can be reduced, resulting in reduced weight for the power distribution system.

Another advantage of the disclosure is that by utilizing low voltage generators and low voltage motors, the respective generators and motors won't require high voltage insulation, further reducing weight and complexity.

the series-combined voltage outputs can make high voltage power available for higher power consuming electrical loads, such as hybrid system that, for example, provide takeoff, climb, or propulsion assist for an aircraft, or direct energy systems.

When designing aircraft components, important factors to address are size, weight, and reliability. The above described power distribution system results in a lower weight, smaller sized, increased performance, and thus, increased reliability system. The lower number of parts and reduced maintenance will lead to a lower product costs and lower operating costs. Reduced weight and size correlate to competitive advantages during flight.

To the extent not already described, the different features and structures of the various aspects can be used in combination with others as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power distribution system comprising:
    a first set of power converters arranged conductively connected in series to define a power converter series, with each of the first set of power converters having a respective set of individual power inputs and having a respective set of individual power outputs;
    an overall power input conductively connected to the set of individual power inputs: and
    at least one controller module communicatively connected with the first set of power converters and configured to controllably adjust the power conversion of the first set of power converters such that each of the first set of power converters are limited to a predetermined amount of power;
    a set of power sources arranged in series to define a power source series connected with the first set of power converters;
    wherein the set of power sources are low voltage power sources;
    a second set of power converters adapted to convert low voltage power from the set of power sources respectfully connected with each of the first set of power converters, to a high voltage power supplied to the first set of power converters.

2. The power distribution system of claim 1, wherein the first set of power converters is adapted to dynamically convert high voltage power to a lower voltage power supplied to the respective set of power outputs.

3. The power distribution system of claim 2 wherein low voltage power is equal to or less than 540 volts direct current (DC) and the high voltage power is equal to or greater than 1080 volts DC.

4. The power distribution system of claim 2 wherein low voltage power is equal to or less than 230 volts alternating current (AC) and the high voltage power is equal to or greater than 460 volts AC.

5. The power distribution system of claim 1, wherein the total amount of power supplied to the first set of power converters by the power source series is greater than 2 kilovolts DC.

6. The power distribution system of claim 1, further comprising a set of power sensors connected with at least a subset of the first set of power converters and adapted to sense power converted by the respective subset of the first set of power converters.

7. The power distribution system of claim 6 wherein the controller module is communicatively connected with the set of power sensors and compares the sensed power converted by the respective subset of the first set of power converters with a threshold power value.

8. The power distribution system of claim 7 wherein the controller module is configured to dynamically control the respective subset of the first set of power converters to limit the amount of power converted when the sensed power converted satisfies the threshold power value.

9. The power distribution system of claim 8 wherein the threshold power value is a predetermined equal amount of power for each of the first set of power converters.

10. The power distribution system of claim 1, further comprising a generator and wherein the first set of power converters comprises a first power converter, the generator is adapted to generate a low voltage power and connected with a second power converter adapted to convert the low voltage power from the generator to a high voltage power supplied to the first power converter.

11. The power distribution system of claim 1, further comprising a single generator having multiple sets of power-generating windings connected w: the set of power inputs.

12. The power distribution system of claim 1, further comprising a set of generators connected with the set of power inputs.

13. The power distribution system of claim 1, further comprising a set of power transformers configured to transform power received by a set of generators, and to supply the transformed power to the set of power inputs.

14. The power distribution system of claim 1, further comprising a set of generators directly connected with the set of power inputs.

15. A method of operating a power distribution system, comprising:
    obtaining, by a set of power converters conductively connected in series to define a power converter series and also having a corresponding set of individual power inputs conductively connected to an overall power converter input, a large power supply;
    converting, by the set of power converters, a portion of the large power supply to a respective set of power converter outputs;
    sensing, by a set of power sensors, a quantity of power converted by a subset of the power converters;
    comparing, by a controller module, the respective sensed quantities of power with a threshold power value; and
    limiting, by the controller module, the quantity of power converted by the subset of the power converters when the respectively sensed quantity of power exceeds the threshold power value, such that each respective power converter obtaining is limited to a predetermined amount of the large power supply; and
    generating, in a set of generators, a second set of low voltage power supplies and converting, in a second set of power converters, the second set of low voltage power supplies respectfully, to a set of high voltage power supplies arranged in series, summating to the high power output.

16. The method of claim 15, further comprising generating, by a set of generators arranged in series to define a generator series, the large power supply, wherein the large power supply exceeds 2 kilovolts DC.

17. The method of claim 15, further comprising supplying the converted portion of the large power supply to a respective set of electric motors.

18. The method of claim 15, further comprising generating, by a single generator having multiple sets of power-generating windings, the large power supply.

19. The method of claim 15, further comprising generating, by a set of generators, the large power supply.

20. The method of claim 15, further comprising transforming, by a set of power transformers, a power output of power source to the large power supply.

21. The method of claim 15, further comprising directly providing, by a set of generators, the large power supply.

22. A method of operating an aircraft power distribution system, comprising:
- obtaining, by a first set of power converters conductively connected in series to define a power converter series and also having a corresponding set of individual power inputs conductively connected to an overall power input a high power output greater than 2 kilovolts DC or 1 kilovolt AC phase voltage; and
- dynamically converting, by the first set of power converters, the high power output to a respective first set of low power outputs;
- wherein the dynamic converting enables each of the first set of power converters to convert a substantially equal portion of the high power output; and
- generating, in a set of generators, a second set of low voltage power supplies and converting, in a second set of power converters, the second set of low voltage power supplies respectfully, to a set of high voltage power supplies arranged in series, summating to the high power output.

23. The method of claim 22, further comprising sensing, by a set of power sensors, a quantity of power converted by the first set of power converters, wherein the dynamic converting is based at least in part on the sensing.

24. The method of claim 23, further comprising comparing, by a controller module, the respective sensed quantities of power with a threshold power value, and limiting, by the controller module, the quantity of power converted by at least a subset of the first set of power converters when the respectively sensed quantity of power exceeds the threshold power value.

\* \* \* \* \*